United States Patent [19]

Muramatsu

[11] Patent Number: 4,672,492
[45] Date of Patent: Jun. 9, 1987

[54] MAGNETIC HEAD ASSEMBLY FOR TAPE RECORDERS HAVING REVERSIBLE TAPE MOTION

[75] Inventor: Hiroshi Muramatsu, Gunma, Japan

[73] Assignee: Victor Company of Japan Limited, Yokohama, Japan

[21] Appl. No.: 869,843

[22] Filed: May 28, 1986

Related U.S. Application Data

[63] Continuation of Ser. No. 537,719, Sep. 30, 1983, abandoned.

[30] Foreign Application Priority Data

Oct. 1, 1982 [JP] Japan ............................... 57-149067
Oct. 1, 1982 [JP] Japan ............................... 57-149069

[51] Int. Cl.⁴ ................................................ G11B 5/56
[52] U.S. Cl. ..................................... 360/109; 360/105
[58] Field of Search .................... 360/104, 105, 75, 76, 360/109

[56] References Cited

U.S. PATENT DOCUMENTS

| | | | |
|---|---|---|---|
| 2,900,625 | 8/1959 | Jones et al. | 360/105 |
| 3,692,314 | 9/1972 | Dattilo | 360/109 |
| 3,882,543 | 5/1975 | Richards | 360/109 |
| 3,925,819 | 12/1975 | Bachmann | 360/105 |
| 4,510,543 | 4/1985 | Ohta et al. | 360/106 |

FOREIGN PATENT DOCUMENTS

| | | |
|---|---|---|
| 2086642 | 5/1982 | United Kingdom . |
| 2100053 | 12/1982 | United Kingdom . |
| 2112993 | 7/1983 | United Kingdom . |

*Primary Examiner*—John H. Wolff
*Assistant Examiner*—Andrew L. Sniezek
*Attorney, Agent, or Firm*—Cushman, Darby & Cushman

[57] ABSTRACT

In a tape recording/reproducing apparatus having reversible tape motion, a magnetic head assembly comprises an outer member movable from a tape noncontact position to a tape contact position, and an inner member carrying a magnetic head. The inner member is mounted in the outer member for movement therewith and rotatable therein from a first angular position to a second angular position upon reversals of tape motion. A certain amount of clearance is provided between the outer and inner housing to ensure smooth rotation of the inner member. A spring is provided for urging the inner member radially into the angular positions against the inner wall of the outer member when the latter is in the tape contact position.

7 Claims, 8 Drawing Figures

MAGNETIC HEAD ASSEMBLY FOR TAPE RECORDERS HAVING REVERSIBLE TAPE MOTION

This is a continuation of application Ser. No. 537,719 filed Sept. 30, 1983 which was abandoned upon the filing hereof.

BACKGROUND OF THE INVENTION

The present invention relates to a magnetic head assembly for tape recorders in which tape motion is reversed automatically for uninterrupted tape operation.

In tape recorders of the type wherein the tape motion is automatically reversed at the end of the tape to eliminate the need for manual reloading operation, the magnetic head is turned 180 degrees from a first to a second operating position in response to the reversal of the tape motion. The magnetic head is currently mounted within a rotary member rotatably disposed in a mounting. To provide fast, smooth switching between the two operating positions a certain amount of clearance is provided between the outer wall of the rotary member and the inner wall of the mounting. Due to the presence of this clearance, however, the operating position of the head tends to become indefinite, resulting in an azimuth angle deviation which might cause a reduction in high frequency response and/or an off-track displacement which might cause a cross-talk between adjacent sound tracks. Furthermore, it is desirable that for proper tape operations the magnetic head be readily adjusted in position with respect to the rotary member to establish head-to-tape alignment.

SUMMARY OF THE INVENTION

It is therefore an object of the invention to provide a magnetic head assembly in which the magnetic head turns quickly and smoothly in response to reversals of tape motion between two definite positions.

For a tape recording/reproducing apparatus having means for automatically reversing the direction of movement of a tape, the invention provides a magnetic head assembly which comprises an outer member movable from a tape noncontact position to a tape contact position, and an inner member carrying a magnetic head and loosely mounted in the outer member for movement therewith. The inner member is rotatable in the outer member from a first angular position to a second angular position in response to the operation of the tape reversing means. To allow smooth rotation of the inner member a certain amount of clearance is provided between the outer and inner members. The inner member is urged radially into the angular positions against the inner wall of the outer member when the latter is in the tape contact position.

BRIEF DESCRIPTION OF THE DRAWINGS

The present invention will be described in further detail with reference to the accompanying drawings, in which.

DETAILED DESCRIPTION

Figure 1:
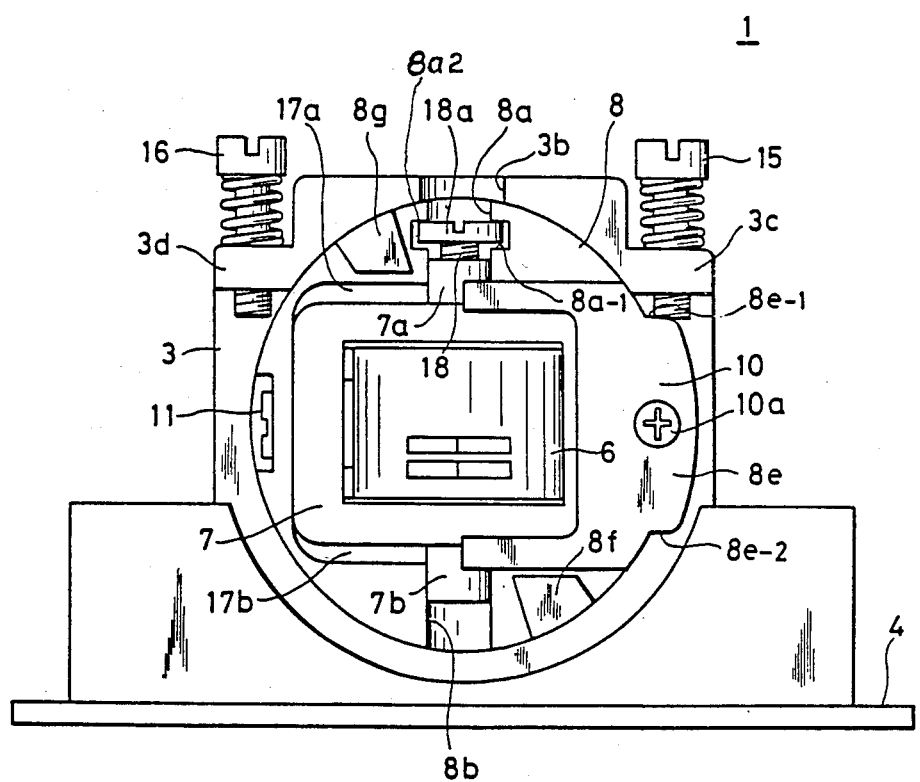
FIG. 1 is a front view of a magnetic head assembly of the invention.
Figure 2:
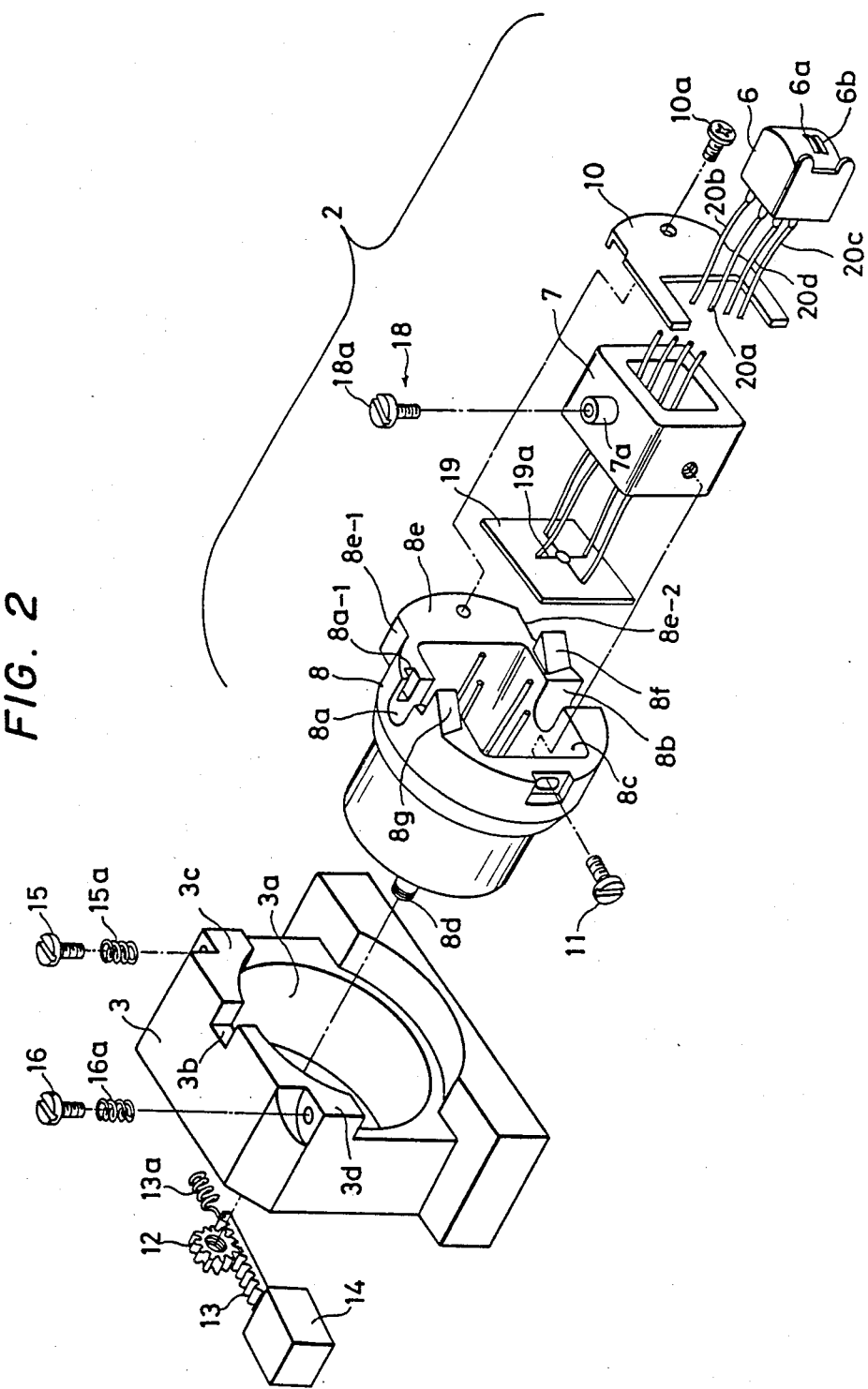
FIG. 2 is an exploded perspective view of the magnetic head assembly.

Referring to FIGS. 1 and 2, a magnetic head assembly is shown at 1 and comprises a rotary head subassembly 2 and a head mounting 3 on a base 4. The head assembly 1 is mounted on a known mechanism, not shown, which moves the assembly from a nonworking position in which the magnetic tape is at rest to a working position in which the magnetic tape is transported in one direction for playing a material on a first track and subsequently in the opposite direction for playing a material on an adjacent track. The reversal of tape motion is effected by a well known means which is omitted for the sake of simplicity.

The subassembly 2 comprises a magnetic head 6 having a pair of cores 6a and 6b, an inner head housing 7 in which the magnetic head 6 is housed, and an outer head housing 8 having a rectangular inner space 8c for adjustably accommodating the inner housing 7 therein. The inner housing 7 is of a rectangular framed construction and formed with an internally threaded, upper projection 7a and a lower projection 7b which are engaged in recesses 8a and 8b formed in a front portion of the outer housing 8, respectively. A pair of side recesses or grooves 8a-1, 8a-2 are formed in the outer housing 8 to accommodate the head 18a of an adjustment screw 18 to allow vertical adjustment of the magnetic head 6 relative to a magnetic tape. The magnetic head 6 is held in the inner housing 7 by screws or adhesive. The inner housing 7 with the head 6 secured therein is held in the outer housing 8 by a fixing plate 10 which is fixed to the outer housing 8 with a screw 10a. The inner housing 7 is adjustably held in the outer housing 8 by a fixing screw 11 and the adjustment screw 18 which threadably engages with the upper projection 7a of the inner housing 7. Connecting wires 20a to 20d are coupled from the terminals of the magnetic head 6 through crossed slits 19a of a clamp 19 to the outside of the mounting 3.

The outer head housing 8 has a cylindrical rear portion which is loosely accommodated in a correspondingly cylindrical space 3a of the mounting 3 for rotation therein and includes an externally serrated shaft 8d extending outside of the rear wall of the mounting 3 for firm engagement with an internally serrated pinion 12 which meshes with a rack 13 which coupled to the plunger of a solenoid 14 and biased by a spring 13a. The solenoid 14 is normally not energized when the tape is transported in a normal direction and energized upon reversal of tape motion.

The front portion of the outer housing 8 remains extended from the mounting 3 and is provided on one side thereof with an arcuate extension 8e having upper and lower contact surfaces 8e-1 and 8e-2. The mounting 3 has a recess 3b through which a screw driver is manually inserted to engage with the adjustment screw 18. A pair of shoulders 3c and 3d are formed in the mounting 3. Azimuth adjustment screws 15 and 16, threadably engaged with the shoulders 3c and 3d respectively, depend from the shoulders to define points of contact with the surface 8e-1 and 8e-2, respectively, of the outer housing 8. When the subassembly is in a first operating position the adjustment screw 15 is in contact with the surface 8e-1 and when the subassembly is in a second operating position which is displaced 180 degrees with respect to the first position the adjustment screw 16 is in contact with the surface 8e-2 as will be described below.

In FIG. 1, the rotary subassembly 2 is shown disposed in the first operating position in which the adjustment screw 15 is in contact with the surface 8e-1 of the extension 8e.

According to a feature of the invention, the front portion of the outer housing 8 is formed with forwardly extending projections 8f and 8g located in diametrically opposite positions to each other. The projection 8f has a pressure-receiving surface which is inclined so that projection 8f is low in profile at its left side compared with its right side when the subassembly is in the first operating position. This inclination will produce a rightwardly rearwardly directed thrust to the subassembly if the projection 8f is urged rearward. Likewise, the projection 8g has a pressure-receiving surface which is inclined in a direction opposite to that of the surface of projection 8f when projection 8g comes to the lower position so as to impart a leftwardly rearwardly directed thrust to the subassembly when the latter is turned half revolution to the second operating position.

Figure 3A:
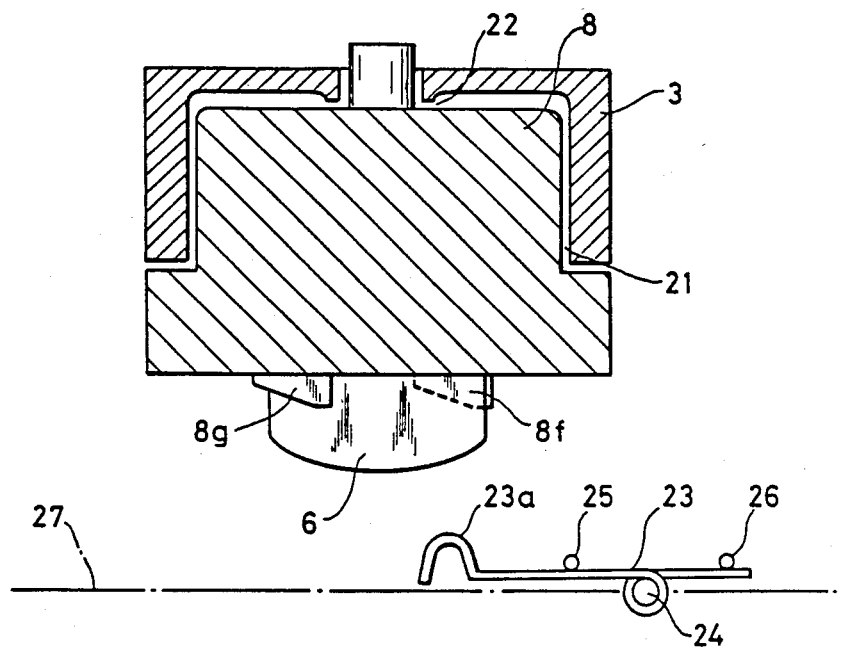
FIGS. 3a and 3b are partial cross-sectional views illustrating the positions of the head assembly relative to a spring in tape-noncontact and tape-contact positions, respectively.

The laterally rearwardly directed thrust is provided by a biasing means shown in FIG. 3a. The biasing means comprises a resin-formed spring 23 mounted on a post 24 and held in position upon contact with posts 25 and 26. The spring 23 is formed with a projection 23a at the free end thereof which is positioned to come into pressure contact with the pressure-receiving surface of the projection 8f as shown in FIG. 3b when the assembly 1 is moved forward to contact with a magnetic tape 27 and when the latter is transported in a first direction for playing a material on a given track.

Upon reversals of tape motion, the solenoid 14 is energized to drive the pinion 12 against the action of the spring 13a, rotating the subassembly 2 by 180 degrees from the first to the second operating position. The projection 8g now comes to the lower right position to engage with the projection 23a of spring 23.

As shown in FIG. 3a, there is a slight clearance 21 between the outer wall of rear portion of outer housing 8 and the inner wall of the mounting 3. Also provided is a slight clearance 22 between the rear walls of the housing 8 and mounting 3. These clearances are intentionally provided for smooth rotation of the subassembly 2 upon reversals of tape motion.

Figure 3B:
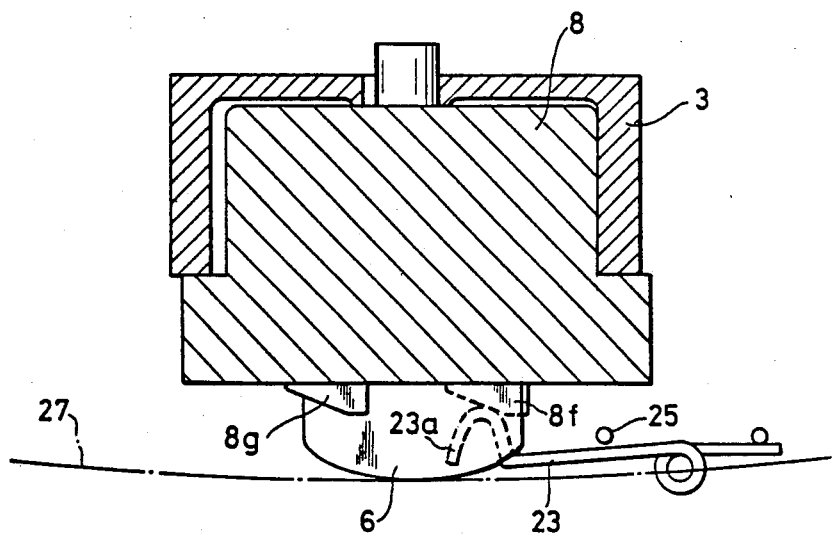
Figure 4A:
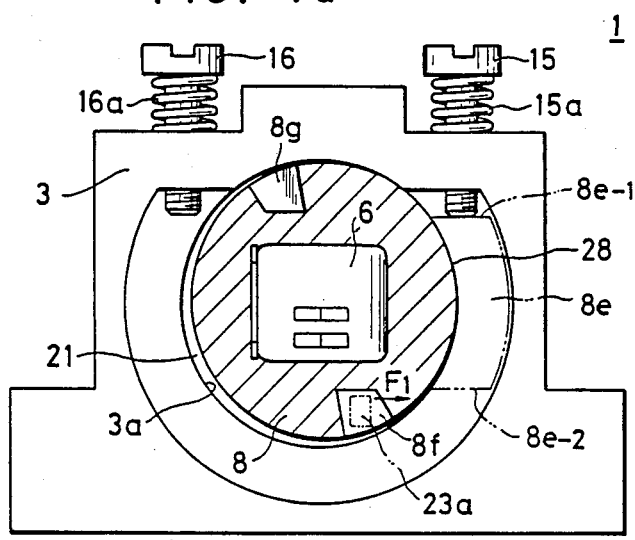
FIGS. 4a and 4b are schematic cross-sectional views useful for describing the operation of the invention.

The operation of the invention will be best understood with reference to FIGS. 3a, 3b, 4a and 4b. When the head assembly 1 is in the first operating position for playing a tape being transported in a first direction, the projection 8f is in the lower position where it engages the projection 23a of spring 23. Due to the inclined surface of the projection 8f, a rightwardly rearwardly directed thrust $F_1$ is produced to urge the outer housing 8 radially rearwardly into the first operating position in which its abutment surface 8e-1 contacts the lower end of screw 15 and the circumference of its rear cylindrical portion makes contact with the inner wall of the mounting 3 as at 28 as shown in FIG. 4a, while it rear wall makes contact with the rear wall of the mounting 3 as shown in FIG. 3b.

Figure 4B:
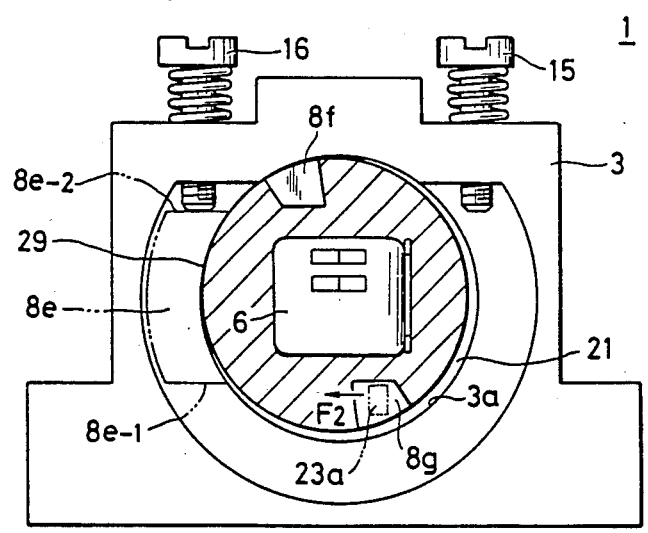

Upon reversal of the tape motion, the projection 8g comes to the lower position as shown in FIG. 4b where it engages with the spring 23. Due to the inclined surface of projection 8g whose direction of inclination in the lower position is opposite to that of the surface of projection 8f, a leftwardly rearwardly directed thrust $F_2$ is produced urging the outer housing 8 radially rearwardly into the second operating position in which its abutment surface 8e-2 comes into contact with the lower end of screw 16 and the circumference of its rear portion makes contact with the inner wall of the mounting 3 as at 29 as shown in FIG. 4b, while its rear wall comes into contact with the rear wall of the mounting 3. Therefore, the azimuth of the subassembly 2 is accurately determined exclusively by screws 15 and 16.

Figure 5:
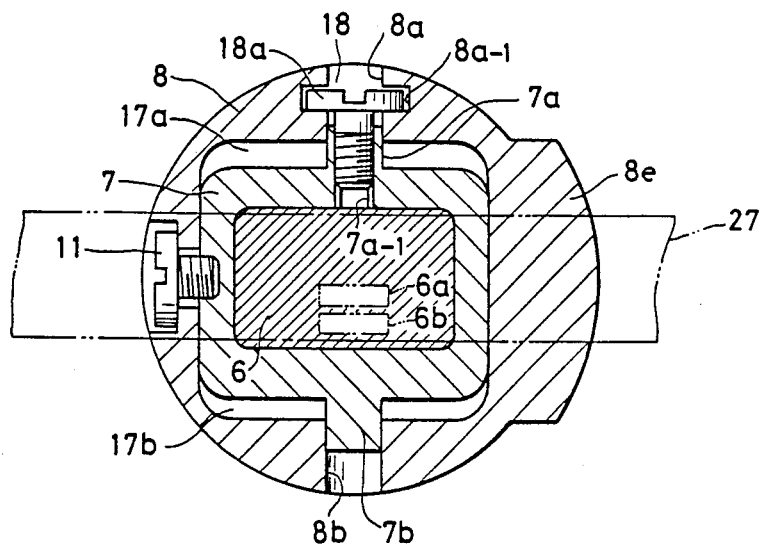
FIG. 5 is a cross-sectional view useful for describing the adjustment of the magnetic head with respect to a magnetic tape.

According to another feature of the invention, clearances 17a and 17b are provided respectively between the top walls of the inner and outer housings and between the bottom walls of these housings, as seen in FIG. 5, to allow the inner housing 7 to move a limited distance within the outer housing 8. The positions of the head cores 6a and 6b can be accurately aligned with the associated tracks of the tape for each direction of tape motion as follows. With the fixing screw 11 being loosened to allow the inner housing 7 to become free to move vertically within the outer housing 8, the screw 18 is adjusted with the use of a screwdriver. Since its screw head 18a is held in the recesses 8a-1 of the outer housing 8 as seen in FIG. 5, the inner housing 7 is moved in vertical directions with respect to the outer housing to a desired position where the cores 6a and 6b are aligned with respective sound tracks of the tape 27 independently of azimuth adjustment. This head-to-tape adjustment is facilitated by the upper and lower projections 7a and 7b which are guided through the grooves 8a and 8b, respectively, as the inner housing 7 is moved. Preferably, this adjustment is made by operating the tape recorder in playback mode in order to allow the operator to evaluate the sound volume derived from each sound track to determine the head-to-tape position. After the adjustment is completed, the fixing screw 11 is tightened.

Figure 6:
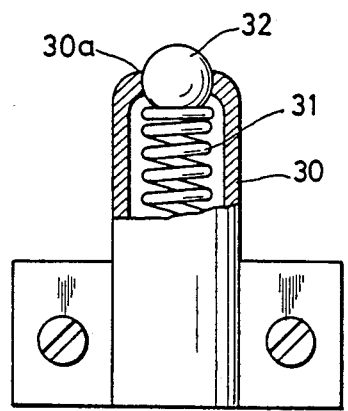
FIG. 6 is an illustration of an alternative form of the spring.

FIG. 6 is an illustration of an alternative embodiment of the biasing means which comprises a cylindrical housing 30 in which a coil spring 31 is disposed. A ball 32 is disposed in an opening 30a of the cylinder 30 under pressure acted upon it by the spring 31.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. Tape recording and/or reproducing apparatus having tape reversing means by which the direction of movement of the tape is automatically reversible, comprising:

a magnetic head assembly movable between a tape non-contact position and a tape contact position, the assembly including an outer member and an inner member carrying a magnetic head and mounted in the outer member for movement therewith, the inner member being rotatable in the outer member from a first angular position to a second angular position in response to the operation of the tape reversing means, there being a clearance between the outer and inner members in radial and axial directions for smooth rotation of the inner member when the assembly is not in the tape contact position, said inner member having a pair of inclined surfaces located in positions corresponding to said first and second angular positions, respectively; and means separate and spaced from said inner member when said head assembly is in the tape non-contact position and arranged to come into contact with one of said inclined surfaces when said assembly is moved to the tape contact position for simultaneously biasing the inner member radially and axially against the inner walls of the outer member to thereby firmly hold the inner member in each one of said first and second angular positions.

2. Apparatus according to claim 1, wherein the biasing means is fixed relative to the assembly, and wherein the inner member includes a pair of first and second projections having said inclined surfaces respectively and arranged at diametrically opposite positions with respect to each other so that each one of the first and second projections comes to a predetermined common position when the inner member turns a half revolution to receive pressure from the biasing means.

3. Apparatus according to claim 2, wherein the first and second projections are located symmetrically with respect to the axis of rotation of the inner member.

4. Apparatus according to claim 1, further comprising means for individually adjusting the first and second angular positions to determine an azimuth angle of the magnetic head.

5. Apparatus according to claim 1, wherein the inner member is formed with a pair of angularly spaced apart first and second abutment surfaces formed on the circumference thereof, and wherein the outer member includes a pair of shoulders in which adjustment screws are mounted to define first and second points of contact with the first and second abutment surfaces, respectively, the first and second points of contact corresponding respectively with the first and second angular positions of the inner member.

6. Apparatus according to claim 1, wherein the magnetic head is adjustably mounted in the inner member.

7. Apparatus according to claim 6, wherein the inner member has a guide groove and the head has a guide member slidably disposed in the guide groove and an adjustment screw for adjustably moving the head.

* * * * *